(12) United States Patent
Liu et al.

(10) Patent No.: US 7,744,958 B2
(45) Date of Patent: *Jun. 29, 2010

(54) METHOD FOR MAKING CARBON NANOTUBE-BASED DEVICE

(75) Inventors: Liang Liu, Beijing (CN); Shou-Shan Fan, Beijing (CN)

(73) Assignees: Tsinghua University, Beijing (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 1021 days.

This patent is subject to a terminal disclaimer.

(21) Appl. No.: 11/416,748

(22) Filed: May 3, 2006

(65) Prior Publication Data

US 2007/0071895 A1 Mar. 29, 2007

(30) Foreign Application Priority Data

Jul. 13, 2005 (CN) .................... 2005 1 0035986

(51) Int. Cl.
*C23C 16/00* (2006.01)
*C01B 31/00* (2006.01)
*D01F 9/12* (2006.01)

(52) U.S. Cl. ................. 427/249.1; 427/248.1; 977/840; 977/843; 977/890; 423/445 R; 423/447.1; 423/447.3

(58) Field of Classification Search ............... 427/248.1; 977/840

See application file for complete search history.

(56) References Cited

U.S. PATENT DOCUMENTS 4,776,868 A * 10/1988 Trotter et al. ................. 65/17.4

5,866,204 A * 2/1999 Robbie et al. ............... 427/256

(Continued)

FOREIGN PATENT DOCUMENTS

JP 62007851 1/1987

(Continued)

OTHER PUBLICATIONS

Guillorn "Fabrication of gated cathode structures using an in situ grown vertically aligned carbon nanofiber as a field emission element" J. Vac. Sci. Technol. B 19(2) Mar./ Apr. 2001. p. 573-578.*

(Continued)

*Primary Examiner*—David Turocy
*Assistant Examiner*—Mandy C Louie
(74) *Attorney, Agent, or Firm*—Jeffrey T. Knapp

(57) ABSTRACT

A method for making a carbon nanotube-based device is provided. A substrate with a shadow mask layer formed thereon is provided, to define an unmasked surface area on the substrate. The substrate is rotated around an axis. A catalyst layer including at least one catalyst block is formed on the unmasked surface area of the substrate. A thickness of the at least one catalyst block is decreased gradually from a first end thereof to an opposite second end thereof, and somewhere the at least one catalyst block having a region with a thickness proximal or equal to an optimum thickness at which carbon nanotubes growing fastest. A carbon source gas is introduced. At least one carbon nanotube array extending from the catalyst layer using a chemical vapor deposition process is formed. The at least one carbon nanotube array is arc-shaped, and bend in a direction of deviating from the region.

18 Claims, 4 Drawing Sheets

U.S. PATENT DOCUMENTS

| | | | |
|---|---|---|---|
| 6,013,544 A * | 1/2000 | Makita et al. | 438/166 |
| 6,232,706 B1 | 5/2001 | Dai et al. | |
| 6,506,695 B2 | 1/2003 | Gardner et al. | |
| 7,099,963 B2 | 8/2006 | Byers et al. | |
| 7,147,831 B2 | 12/2006 | Liu et al. | |
| 7,291,319 B2 | 11/2007 | Liu et al. | |
| 2003/0102099 A1 * | 6/2003 | Yadav et al. | 162/208 |
| 2004/0109815 A1 | 6/2004 | Liu et al. | |
| 2004/0136896 A1 * | 7/2004 | Liu et al. | 423/447.3 |
| 2004/0191158 A1 * | 9/2004 | Liu et al. | 423/447.3 |
| 2006/0035084 A1 | 2/2006 | Liu et al. | |

FOREIGN PATENT DOCUMENTS

| | | |
|---|---|---|
| JP | 2002071944 | 3/2002 |
| JP | 2005068510 | 3/2005 |

OTHER PUBLICATIONS

Yuegang Zhang et al, Electric-field-directed growth of aligned single-walled carbon nanotubes, Appl. Phys. Lett., Nov. 5, 2001, 3155-3157, vol. 79, No. 19.

B. Q. Wei et al, Organized assembly of carbon nanotubes, Nature, Apr. 4, 2002, 495-496, vol. 416.

S. S. Fan et al, Self-oriented regular arrays of carbon nanotubes and their field emission properties, Science, Jan. 22, 1999, 512-514, vol. 283.

Z. F. Ren et al, Synthesis of large arrays of well-aligned carbon nanotubes on glass, Science, Nov. 6, 1998, 1105-1107, vol. 282.

* cited by examiner

US 7,744,958 B2

METHOD FOR MAKING CARBON NANOTUBE-BASED DEVICE

CROSS-REFERENCE TO RELATED APPLICATION

This application is related to one copending U.S. patent application entitled "METHOD FOR MAKING CARBON-NANOTUBE-BASED DEVICE", recently filed with the application Ser. No. 11/416,724, and having the same assignee as the instant application and. The disclosure of the above-identified application is incorporated herein by reference.

TECHNICAL FIELD

The present invention generally relates to a method for making a carbon nanotube-based device.

BACKGROUND

Carbon nanotubes are very small tube-shaped structures essentially having the composition of a graphite sheet, formed as a tube. Carbon nanotubes produced by arc discharge between graphite rods were first discovered and reported in an article by Sumio Iijima entitled "Helical Microtubules of Graphitic Carbon" (Nature, Vol. 354, Nov. 7, 1991, pp. 56-58). Carbon nanotubes have very good electrical conductance due to their structure. They are also chemically stable, and have very small diameters (less than 100 nanometers) and large aspect ratios (length/diameter). Due to these and other properties, it has been suggested that carbon nanotubes can play an important role in fields such as microscopic electronics, materials science, biology, and chemistry, etc.

Although carbon nanotubes promise to have a wide range of applications, better control is needed over the building and organization of nanotube-based architectures. Normally, the orientation of growing nanotubes is controlled such that the nanotubes are rectilinear and parallel to each other. Chemical vapor deposition has been used to produce nanotubes vertically aligned on catalyst-printed substrates.

There have been reports of growth of aligned carbon nanotubes using chemical vapor deposition, for instance, Z. F. Ren et al. entitled "Synthesis of large arrays of well-aligned carbon nanotubes on glass" (Science, Vol. 282, Nov. 6, 1992, pp. 1105-1107); S. S. Fan et al. entitled "Self-oriented regular arrays of carbon nanotubes and their field emission properties" (Science, Vol. 283, Jan. 2, 1999, pp. 512-514); B. Q. Wei et al. entitled "Organized assembly of carbon nanotubes" (Nature, Vol. 416, Apr. 4, 2002, pp. 495-496); and Yuegang Zhang et al. entitled "Electric-Field-Directed Growth of Aligned Single-Walled Carbon Nanotubes" (Applied Physics Letters, Vol. 79, No. 19, Nov. 5, 2001, pp. 3155-3157).

However, carbon nanotubes obtained by the above-mentioned methods are aligned along a linear direction, and/or extend perpendicularly from the substrates. Furthermore, the method of using an external electric field to control a direction of growth of the carbon nanotubes is difficult to apply in generating localized complicated structures with plural orientations of the carbon nanotubes. Accordingly, the range of diversity of different kinds of carbon nanotube-based devices is limited.

What is needed to provide a method for making a carbon nanotube-based device with plural orientations of carbon nanotubes.

SUMMARY

In a preferred embodiment, a method for making a carbon nanotube-based device is provided. The method includes the following steps of providing a substrate with a shadow mask layer formed thereon, the shadow mask layer being configured for defining an unmasked surface area on the substrate; rotating the substrate around an axis; forming a catalyst layer including at least one catalyst block on the unmasked surface area of the substrate, a thickness of the at least one catalyst block being gradually decreased from a first end thereof to an opposite second end thereof, and somewhere the least one catalyst block having a region with a thickness proximal or equal to an optimum thickness at which carbon nanotubes growing fastest; introducing a carbon source gas; and forming at least one carbon nanotube array extending from the catalyst layer using a chemical vapor deposition process, wherein the at least one carbon nanotube array being arc-shaped, and bending in a direction of deviating from the region.

Theoretically, the growth rate of carbon nanotubes is associated with a thickness of the catalyst layer used to grow them on. Under certain conditions for growing carbon nanotubes by a chemical vapor deposition process, the carbon nanotubes grow fastest when the catalyst layer has a certain optimum thickness. In particular, when the thickness of the catalyst layer is greater than the optimum thickness, the thicker the catalyst layer, the slower the growth rate of carbon nanotubes; when the thickness of the catalyst layer is less than the optimum thickness, the thinner the catalyst layer, the slower the growth rate of carbon nanotubes. If the thickness of the catalyst layer is deliberately controlled, so that the thickness gradually changes from a first end to an opposite second end, and somewhere the catalyst layer has a thickness proximal or equal to the optimum thickness at which carbon nanotube growing fastest; additionally, carbon nanotubes have inherently strong Van der Waals force interactions therebetween. Accordingly, a carbon nanotube-based device with plural orientations of carbon nanotubes is obtainable.

Other advantages and novel features will become more apparent from the following detailed description of embodiments when taken in conjunction with the accompanying drawings.

BRIEF DESCRIPTION OF THE DRAWINGS

The components in the drawings are not necessarily to scale, the emphasis instead being placed upon clearly illustrating the principles of the present method for making a carbon nanotube-based device. Moreover, in the drawings, like reference numerals designate corresponding parts throughout the several views.

The exemplifications set out herein illustrate at least one preferred embodiment, in one form, and such exemplifications are not to be construed as limiting the scope of the present method for making a carbon nanotube-based device in any manner.

DETAILED DESCRIPTION OF THE EMBODIMENT

FIGS. 1-5 together illustrate successive stages in a process for forming a catalyst layer on a substrate, in accordance with a preferred embodiment.

Figure 1:
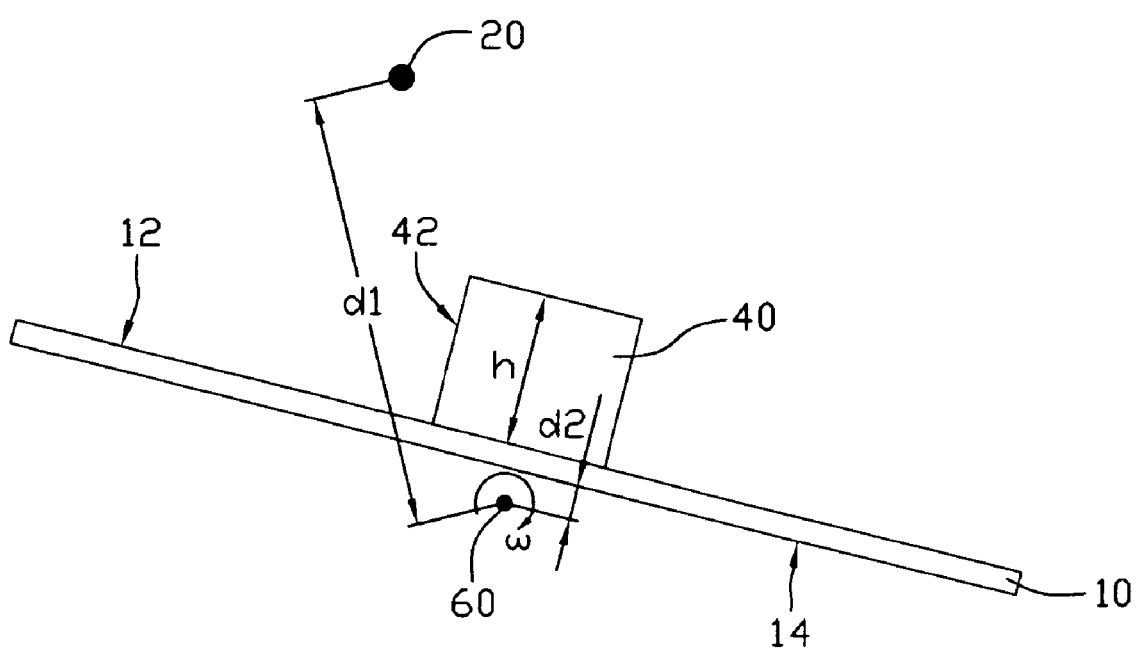
FIG. 1 is a schematic, cross-sectional view of one stage in a procedure for depositing a catalyst layer on a substrate in accordance with a preferred embodiment.

Referring to FIG. 1, a substrate 10 is first provided. Suitable substrate materials include a variety of materials, such as metals, semiconductors and insulators, for example, silicon (Si), silicon dioxide ($SiO_2$) and glass. It is possible that the substrate 10 will, in practice, be a portion of a device, e.g., a silicon-based integrated circuit device, on which nanotube formation is desired. The substrate 10 can be rotate around an axis 60 usually disposed beside the substrate 10. In the illustrated embodiment, the axis 60 is disposed substantially parallel to the substrate 10. It is understood that an angle between the axis 60 and a surface 14 of the substrate 10 can be a suitable acute angle instead.

A shadow mask layer 40 is formed on the substrate 10, and to define an unmasked surface area 12 of the substrate 10 to be exposed. The shadow mask layer 40 is usually made from photo-resist, metal, metallic oxide, or metallic nitride. The shadow mask layer 40 has a suitable height (as denoted by h in FIG. 1) to shade a catalyst source 20 disposed beside the substrate 10, in order to obtain a catalyst layer having a gradient thickness formed on the unmask surface area 12 of the substrate 10. Advantageously, the shadow mask layer 40 has a plurality of sidewalls 42 substantially perpendicular to the substrate 10.

The catalyst source 20 is configured for supplying a catalyst material and depositing the catalyst material onto the substrate 10. The catalyst material is usually selected from iron (Fe), cobalt (Co), nickel (Ni), or alloys thereof. Generally, a distance from the catalyst source 20 to the substrate 10 is no less than ten times the size of the substrate 10. A distance $d_1$ (as shown in FIG. 1) from the catalyst source 20 to the axis 60 is larger than a distance $d_2$ (as shown in FIG. 1) from the axis 60 to the substrate 10. The catalyst source 20 can be a point evaporating source, or a linear evaporating source. In the case of the catalyst source 20 being a linear evaporating source, an optimum solution is that the catalyst source 20 is disposed along the axis 60. In the illustrated embodiment, the catalyst source 20 is a point evaporating source.

Figure 2:
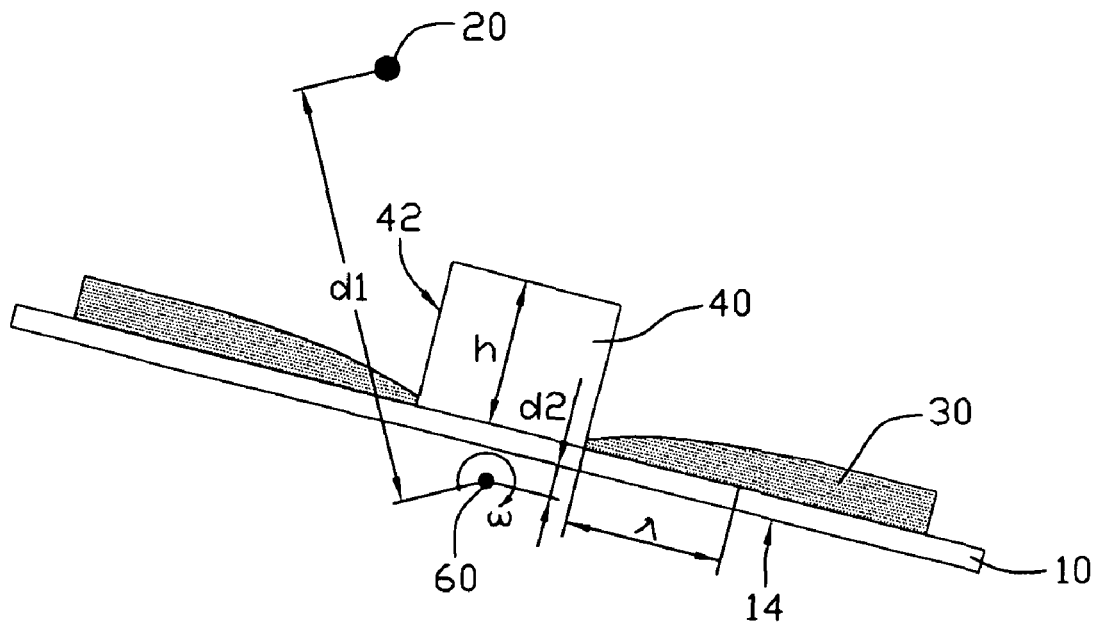
FIG. 2 is a schematic, cross-sectional view of a subsequent stage in a procedure for depositing a catalyst layer on a substrate in accordance with a preferred embodiment.

Referring to FIG. 2, during a process of depositing a catalyst layer 30 on the substrate 10, the substrate 10 rotates around the axis 60 with an angular velocity ω (as shown in FIG. 1), that is, the rotation period of the substrate 10 is approximately equal to $2\pi/\omega$. The catalyst source 20 is evaporated by a thermal evaporation method or an electron beam evaporation method, and then the evaporated catalyst material radially deposits onto the surface 12. Due to the shading effect of the shadow mask layer 40 to the catalyst material generated from the catalyst source 20, the catalyst layer 30 having a gradient thickness is formed on the unmasked surface area 12 of the substrate 10, and located at opposite sides of the axis 60. The duration time for forming the catalyst layer 30 is usually longer than the rotation period of the substrate 10. Preferably, the duration time is no less than ten times the rotation period.

Generally, a thickness $T(\lambda)$ of a position of the catalyst layer 30 distant from the shadow mask layer 40 with a distance of λ approximately satisfies the following condition:

$$T(\lambda)=T_0/2\times(1+\lambda/\sqrt{\lambda^2+h^2})$$

where, $T_0$ is a thickness of the position under a situation that no shadow mask layer 40 formed on the substrate 10 during the deposition process; h is a height of the shadow mask layer 40.

Figure 3:
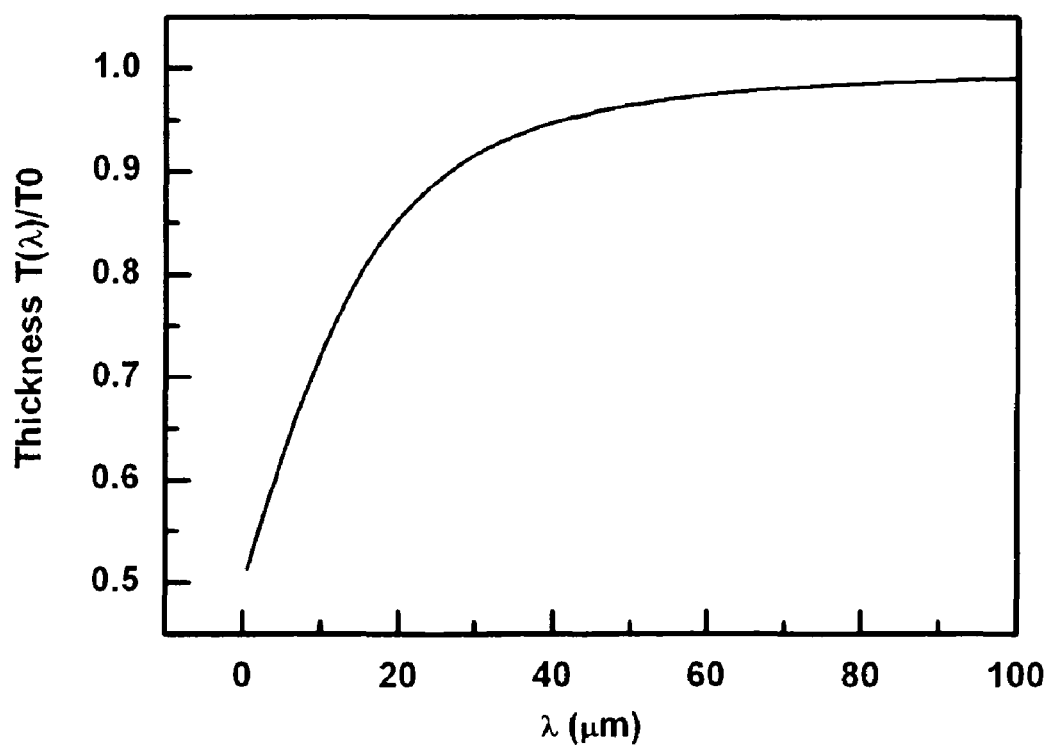
FIG. 3 is a graph showing a relationship between the relative thickness of a position of the catalyst layer distant from the shadow mask layer with a distance of $\lambda$ and the distance of $\lambda$, in accordance with the preferred embodiment.

Referring to FIG. 3, a relationship between the relative thickness ($T(\lambda)/T_0$) of the position of the catalyst layer 30 distant from the shadow mask layer 40 with a distance of λ and the distance of λ is clearly illustrated. In the illustrated embodiment, the height h of the shadow mask layer 40 is equal to 20 μm. It is realized that an obvious gradient thickness exists in the region where λ varies from 0 to 2 h; and the size of the region is correlated with the height h of the shadow mask layer 40. In practice, the region having obvious gradient thickness usually fully covers a region used for growing carbon nanotubes of an expected carbon nanotube-base device.

Figure 4:
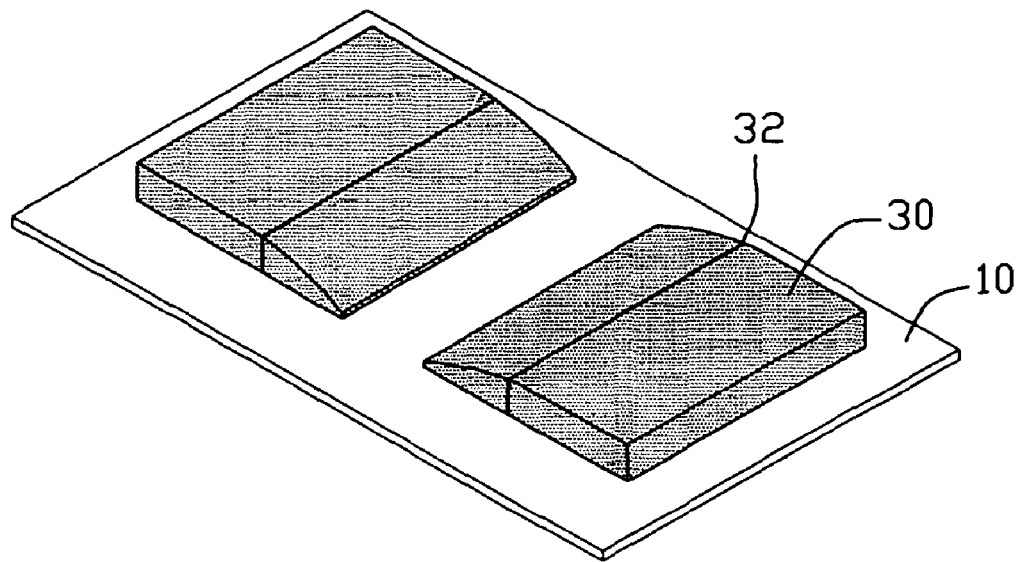
FIG. 4 is an isometric view of the substrate of FIG. 2 with the catalyst layer formed thereon, after a shadow mask layer being removed, and further showing a region with a thickness proximal or equal to an optimum thickness at which carbon nanotubes growing fastest, in the catalyst layer being marked.

Referring to FIG. 4, the shadow mask layer 40 is removed from the substrate 10. A region 32 of the catalyst layer 30 is marked for purpose of determining the growth direction of carbon nanotubes. The region 32 is defined as a region with a thickness proximal or equal to an optimum thickness at which carbon nanotubes growing fastest. That is, under certain conditions for growing carbon nanotubes by a chemical vapor deposition process, the carbon nanotubes grow fastest at where a region of the catalyst layer 30 has an optimum thickness. If the conditions for growing the carbon nanotubes by the chemical vapor deposition process are predetermined, the optimum thickness can be determined accordingly. In the illustrated embodiment, as an example, the catalyst material is iron, a carbon source gas is ethylene, a temperature at which the carbon nanotubes are grown is about 700° C. (degrees Celsius). Accordingly, an optimum thickness of the catalyst layer 30 for growing carbon nanotubes is about 5 nanometers, i.e., the region 32 in this condition has a thickness proximal or equal to 5 nanometers.

Figure 5:
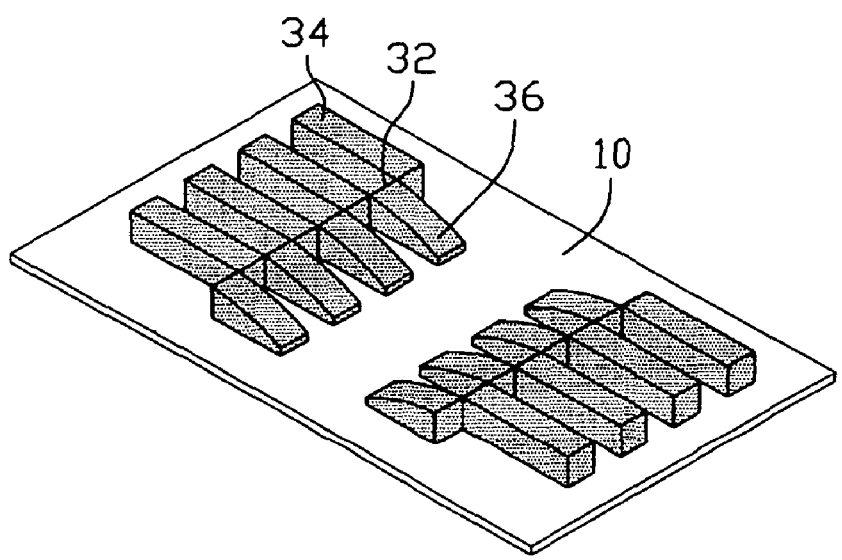
FIG. 5 is similar to FIG. 4, but showing the catalyst layer patterned into a plurality of catalyst blocks positioned at opposite sides of the region.

Referring to FIG. 5, the catalyst layer 30 can be patterned to meet various configurations of resultant carbon nanotube-based devices. The patterned catalyst layer 30 includes at least one catalyst block having a gradient thickness, and somewhere the at least one catalyst block has a thickness proximal or equal to the optimum thickness at which carbon nanotubes growing fastest. In particular, a thickness of the at least one catalyst block is gradually varied from a first end thereof to an opposite second end thereof. The at least one catalyst block somewhere from the first end to the second end, has a thickness proximal or equal to the optimum thickness.

Advantageously, when the patterned catalyst layer 30 is made from iron, a thickness of the thickest end of the at least one catalyst block is in the range from 5 nm to 20 nm, and a thickness of the thinnest end of the at least one catalyst block is in the range from 1 nm to 10 nm. In the illustrated embodiment, the patterned catalyst layer 30 includes a plurality of catalyst blocks 34, 36 staggeringly positioned at opposite sides of the region 32. A thinnest end of each the catalyst blocks 34 has a thickness proximal or equal to the optimum thickness, and a thickest end of each the catalyst blocks 36 has a thickness proximal or equal to the optimum thickness. The pattern is defined using a photolithography process.

It is understood that, a catalyst layer having a predetermined pattern can be directly formed, without the patterning step as above-mentioned. The formation of such a catalyst layer is actually the product of a series of substeps. A shadow mask layer having a reverse pattern corresponding to the predetermined pattern is formed on the substrate 10, to define a unmasked surface area same to the predetermined pattern. After a catalyst layer deposition process similar to the process as above-mentioned is implemented, and the shadow mask layer is removed using a lift-off process, a catalyst layer having a predetermined pattern can be directly formed on the substrate 10.

Figure 6:
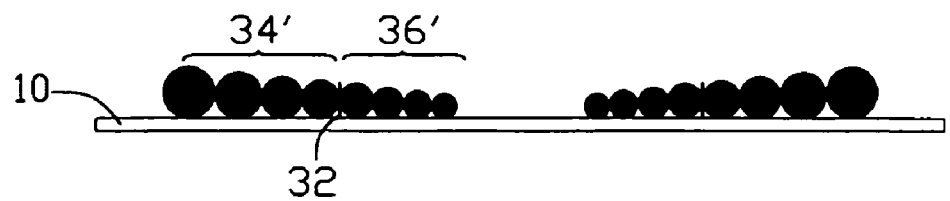
FIG. 6 is an enlarged, side view of the substrate and catalyst blocks of FIG. 5 after being annealed.
Figure 7:
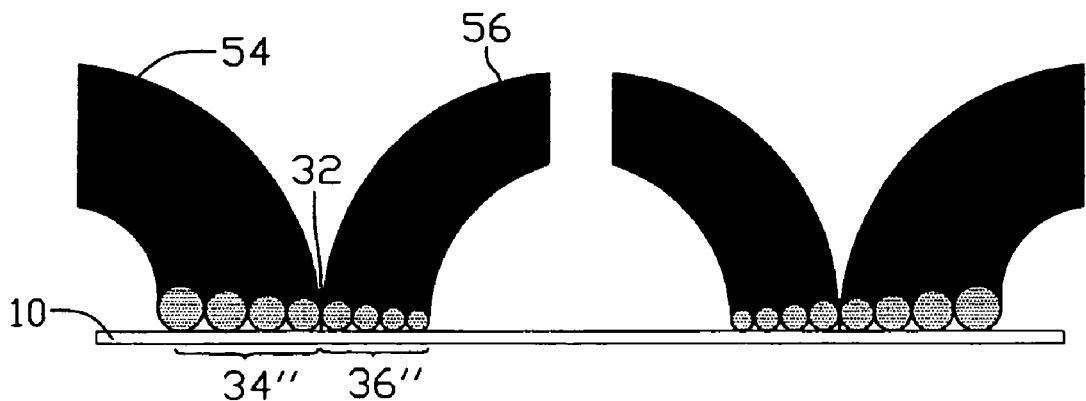
FIG. 7 is an enlarged, side view of a carbon nanotube-based device in accordance with the preferred embodiment, obtained by treating the catalyst blocks of FIG. 5.

FIGS. 6-7 together illustrate successive stages in a process for forming a carbon nanotube-based device with plural orientations of carbon nanotubes based on the above-described catalyst layer 30, in accordance with the preferred embodiment.

Referring to FIG. 6, the substrate 10 with the catalyst blocks 34, 36 is annealed in an oxygen-containing environment at about 300° C., thereby oxidizing the catalyst blocks 34, 36 to form nano-sized catalyst oxide particles 34', 36'. Consequently, the thinner a portion of the catalyst blocks 34, 36 is, the smaller the diameters of the catalyst oxide particles 34', 36' formed from that portion are. Likewise, the thicker a portion of the catalyst blocks 34, 36 is, the larger the diameters of the catalyst oxide particles 34', 36' formed from that portion are.

Thereafter, the treated substrate 10 is placed in a furnace (not shown), a carbon source gas is introduced into the furnace, and then a chemical vapor deposition process similar to that of defining the region 32 of the catalyst layer 30 is implemented. In particular, a protective gas with the carbon source gas together are introduced into the furnace at a predetermined temperature (e.g. 500~900° C.). The carbon source gas can be acetylene, ethylene, methane or any suitable carbon-containing gas. The protective gas can be a noble gas or nitrogen. The protective gas and carbon source gas are introduced at suitable flow rates respectively (e.g. 160 sccm and 80 sccm).

Referring to FIG. 7, a plurality of carbon nanotube arrays 54, 56 extending from the substrate 10 can be formed. During the process of growing the carbon nanotube arrays 54, 56, the carbon source gas is decomposed into carbon atoms and hydrogen gas in a catalytic reaction process catalyzed by the nano-sized catalyst oxide particles 34', 36', thus the catalyst oxide particles 34', 36' are deoxidized to catalyst particles 34", 36" by the hydrogen gas. More detailed information on growth of a carbon nanotube array is taught in U.S. Pat. No. 6,232,706 entitled "Self-Oriented Bundles of Carbon Nanotubes and Method of Making Same," which is incorporated herein by reference. Due to inherently strong Van der Waals force interactions between the carbon nanotubes, the carbon nanotubes are bundled together, and the carbon nanotube arrays 54, 56 extend in arc shapes bending in respective directions deviating from the region 32 of the catalyst layer 30.

Figure 8:
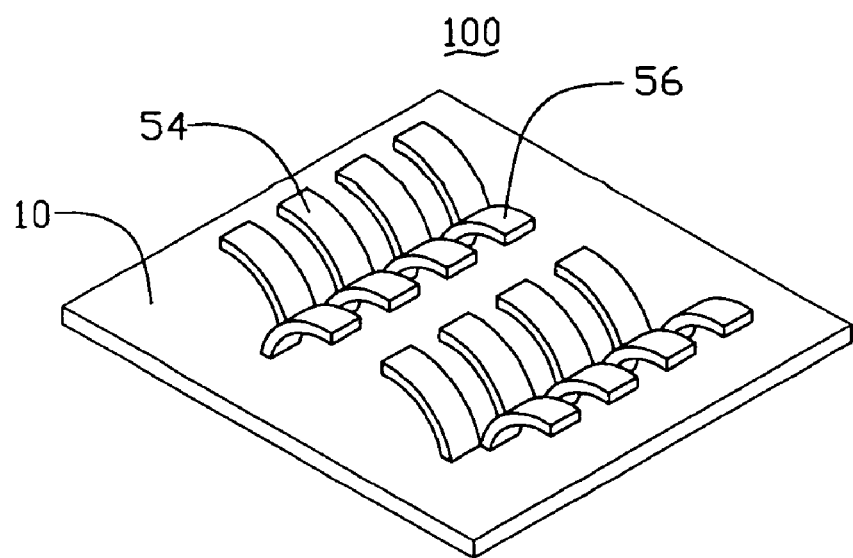
FIG. 8 is an isometric view of the carbon nanotube-based device of FIG. 7.

Referring to FIG. 8, a resultant carbon nanotube-based device 100 with plural orientations of the carbon nanotube arrays 54, 56 can be formed. The carbon nanotube-based device 100 includes the substrate 10, and a plurality of carbon nanotube arrays 54, 56 extending from the catalyst layer 30 (as shown in FIG. 6), supported by the substrate 10. The carbon nanotube arrays 54, 56 are arc-shaped, and bend in respective directions deviating from the region 32.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A method for making a carbon nanotube-based device, the method comprising the steps of:
   providing a substrate with a shadow mask layer formed thereon, the shadow mask layer being configured for defining an unmasked surface area on the substrate;
   rotating the substrate around an axis;
   forming a catalyst layer comprising at least one catalyst block on the unmasked surface area of the substrate, a thickness of the at least one catalyst block being gradually decreased from a first end thereof to an opposite second end thereof, and the at least one catalyst block having a region with a thickness proximal or equal to an optimum thickness at which carbon nanotubes grow the fastest, a thicker region having a thickness that is thicker than the optimum thickness, and a thinner region having a thickness that is thinner than the optimum thickness, such that the carbon nanotubes in the thicker and thinner regions grow slower than the carbon nanotubes at the region;
   introducing a carbon source gas; and
   forming at least one carbon nanotube array extending from the catalyst layer using a chemical vapor deposition process, wherein the at least one carbon nanotube array comprises of at least two arc-shaped sections, and each section bending in a direction deviating from the region.

2. The method of claim 1, wherein the step of forming the catalyst layer on the substrate comprising the sub-steps of:
   disposing a catalyst source on a same side of the substrate with the shadow mask, the catalyst source being configured for supplying a catalyst material and depositing the catalyst material onto the unmasked surface area of the substrate, and a distance from the catalyst source to the axis being larger than a distance from the axis to the substrate;
   depositing the catalyst material on the substrate by evaporating the catalyst material of the catalyst source, to form an initial catalyst layer;
   removing the shadow mask layer from the substrate; and
   defining the initial catalyst layer in a pattern, to form the catalyst layer.

3. The method of claim 2, further comprising a step of marking the region of the initial catalyst layer, before defining the initial catalyst layer in a pattern.

4. The method of claim 2, wherein the catalyst source is selected from the group consisting of a point evaporating source, and a linear evaporating source.

5. The method of claim 4, wherein the linear evaporating source is disposed along the axis.

6. The method of claim 2, wherein the catalyst material is selected from the group consisting of iron, cobalt, nickel, and alloys thereof.

7. The method of claim 2, wherein a distance from the catalyst source to the substrate is no less than ten times the size of the substrate.

8. The method of claim 7, wherein a duration time of depositing the catalyst material is no less than ten times a rotation period of the substrate.

9. The method of claim 7, wherein the shadow mask layer has a plurality of sidewalls substantially perpendicular to the substrate.

10. The method of claim 9, wherein a thickness of a position of the initial catalyst layer distant from the shadow mask layer with a distance of $\lambda$ satisfies the condition:

$$T(\lambda)=T_0/2\times(1+\lambda/\sqrt{\lambda^2+h^2})$$

where, the $T(\lambda)$ is a thickness of the position of the initial catalyst layer distant from the shading masking layer with a distance of $\lambda$, $T_0$ is a thickness of the position under a situation that no shadow mask layer formed on the substrate during a process of depositing the catalyst material; h is a height of the shadow mask layer.

11. The method of claim 1, wherein a thickness of the first end of the at least one catalyst block is in the range from 5 to 20 nanometers; a thickness of the second end of the at least one catalyst block is in the range from 1 to 10 nanometers.

12. The method of claim 1, wherein the axis is substantially parallel to the substrate.

13. The method of claim 1, wherein the shadow mask layer is made from a material selected from the group consisting of a photo-resist, a metal, a metallic oxide, and a metallic nitride.

14. The method of claim 1, wherein the step of forming the catalyst layer on the substrate comprising the sub-steps of:
   disposing a catalyst source beside the substrate, the catalyst source being configured for supplying a catalyst material and radially depositing the catalyst material onto the substrate, and a distance from the catalyst source to the axis being larger than a distance from the axis to the substrate;
   depositing the catalyst material on the substrate by evaporating the catalyst material of the catalyst source to form the catalyst layer; and
   removing the shadow mask layer from the substrate.

15. The method of claim 1, further comprising a step of annealing the substrate with the catalyst layer in an oxygen-containing environment, to form nano-sized catalyst oxide particles, before introducing the carbon source gas.

16. The method of claim 1, wherein the optimum thickness of the catalyst layer for growing carbon nanotubes is about 5 nanometers.

17. A method for making a carbon nanotube-based device, the method comprising:
   providing a substrate with an integrated shadow mask layer formed thereon, the shadow mask layer being configured for defining an unmasked surface area on the substrate;
   rotating the substrate around an axis continuously;
   forming a catalyst layer comprising at least two catalyst blocks on the unmasked surface area of the substrate, a thickness of the at least two catalyst blocks being gradually decreased from a first end thereof to an opposite second end thereof, and the at least two catalyst blocks having a region with a thickness proximal or equal to an optimum thickness at which carbon nanotubes grow the fastest, a thicker region having a thickness that is thicker than the optimum thickness, and a thinner region having a thickness that is thinner than the optimum thickness, the at least two catalyst blocks being staggeringly positioned at opposite sides of the region;
   introducing a carbon source gas; and
   forming at least two carbon nanotube arrays extending from the catalyst layer using a chemical vapor deposition process, wherein the at least two carbon nanotube arrays being arc-shaped, and bending in opposite directions deviating from the region.

18. The method of claim 17, wherein a thinnest one of the at least two catalyst blocks has a thickness proximal or equal to the optimum thickness, and a thickest end of the other of the at least two catalyst blocks has a thickness proximal or equal to the optimum thickness.

* * * * *